United States Patent
Sebastian et al.

(10) Patent No.: US 9,904,386 B2
(45) Date of Patent: Feb. 27, 2018

(54) METHOD FOR PATTERNING A MICROSTRUCTURE

(71) Applicant: 3M INNOVATIVE PROPERTIES COMPANY, St. Paul, MN (US)

(72) Inventors: Muthu Sebastian, Singapore (SG); Michael W. Dolezal, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 25 days.

(21) Appl. No.: 15/111,597

(22) PCT Filed: Jan. 15, 2015

(86) PCT No.: PCT/US2015/011560
§ 371 (c)(1),
(2) Date: Jul. 14, 2016

(87) PCT Pub. No.: WO2015/112419
PCT Pub. Date: Jul. 30, 2015

(65) Prior Publication Data
US 2016/0334895 A1    Nov. 17, 2016

Related U.S. Application Data

(60) Provisional application No. 61/930,687, filed on Jan. 23, 2014.

(51) Int. Cl.
*G06F 3/041* (2006.01)
*G02F 1/1343* (2006.01)
(Continued)

(52) U.S. Cl.
CPC .............. *G06F 3/041* (2013.01); *B32B 15/08* (2013.01); *B32B 15/20* (2013.01); *B32B 27/281* (2013.01);
(Continued)

(58) Field of Classification Search
CPC ................... G06F 3/041; G06F 3/044; G06F 2203/04102; G06F 2203/04103;
(Continued)

(56) References Cited

U.S. PATENT DOCUMENTS 5,094,978 A * 3/1992 Miyagaki ............ H01L 31/1884
438/609
5,886,763 A   3/1999 Wolkowicz
(Continued)

FOREIGN PATENT DOCUMENTS

EP    1947551       7/2008
JP    2002-146266   5/2002
(Continued)

OTHER PUBLICATIONS

"HumiSeal 1B73 Acrylic Conformal Coating: Technical Data Sheet," HumiSeal Division, Chase Specialty Coatings, Oct. 2009, 2 pages.
(Continued)

*Primary Examiner* — Joe H Cheng
(74) *Attorney, Agent, or Firm* — Clifton F. Richardson (57) ABSTRACT

The invention relates to a method for patterning one or more portions of a microstructure comprised of a flexible substrate, a conductor disposed on the substrate, and a metal layer disposed on the conductor, wherein the conductor is comprised of a stack of a first and a second transparent conductive oxide (TCO) layer, and a metal doped silicon oxide layer sandwiched between the two TCO layers.

20 Claims, 4 Drawing Sheets

(51) Int. Cl.
G06F 3/044 (2006.01)
B32B 15/08 (2006.01)
B32B 15/20 (2006.01)
B32B 27/28 (2006.01)
B32B 27/32 (2006.01)

(52) U.S. Cl.
CPC ............ *B32B 27/32* (2013.01); *B32B 27/325* (2013.01); *G02F 1/13439* (2013.01); *G06F 3/044* (2013.01); *B32B 2255/10* (2013.01); *B32B 2255/20* (2013.01); *B32B 2307/202* (2013.01); *B32B 2307/412* (2013.01); *B32B 2307/518* (2013.01); *B32B 2457/208* (2013.01); *G06F 2203/04102* (2013.01); *G06F 2203/04103* (2013.01)

(58) Field of Classification Search
CPC ....... B32B 15/08; B32B 15/20; B32B 27/281; B32B 27/32; B32B 27/325; B32B 2255/10; B32B 2255/20; B32B 2307/412; B32B 2307/518; B32B 2457/208; G02F 1/13439
See application file for complete search history.

(56) References Cited

U.S. PATENT DOCUMENTS

| | | | |
|---|---|---|---|
| 9,023,229 B2* | 5/2015 | Sebastian | ............... C09K 13/04 216/103 |
| 2003/0170925 A1 | 9/2003 | Kim | |
| 2005/0118436 A1 | 6/2005 | Bhangale | |
| 2005/0252390 A1 | 11/2005 | Chen | |
| 2006/0289383 A1 | 12/2006 | Song | |
| 2008/0188020 A1 | 8/2008 | Wei-Min | |
| 2009/0040590 A1 | 2/2009 | Sasagawa | |
| 2010/0035378 A1 | 2/2010 | Chang | |
| 2010/0072884 A1 | 3/2010 | Tchakarov | |
| 2010/0141608 A1 | 6/2010 | Huang | |
| 2010/0245973 A1 | 9/2010 | Wang | |
| 2010/0320457 A1 | 12/2010 | Matsubara | |
| 2011/0135892 A1 | 6/2011 | Nashiki | |
| 2011/0139516 A1 | 6/2011 | Nirmal | |
| 2011/0155689 A1 | 6/2011 | Lin | |
| 2011/0212661 A1 | 9/2011 | Lee | |
| 2014/0299365 A1* | 10/2014 | Sebastian | ................ G06F 3/044 174/255 |

FOREIGN PATENT DOCUMENTS

| | | |
|---|---|---|
| JP | 2004-198952 | 7/2004 |
| JP | 2007-227300 | 9/2007 |
| JP | 2008-231361 | 10/2008 |
| WO | WO 1996-010596 | 4/1996 |
| WO | WO 2013-010067 | 1/2013 |
| WO | WO 2013-049267 | 4/2013 |

OTHER PUBLICATIONS

"HumiSeal 1B73 Material Safety Data Sheet," HumiSeal Division, Chase Specialty Coatings; Pittsburgh, PA 15238, Dec. 2006, 4 pages.

Cho, "Fabrication of silicon dioxide submicron channels without nanolithography for single biomolecule detection", Nanotechnology, 2007, vol. 18, No. 465303, pp. 1-6.

Chu, "Conformational conversion and chain ordering in cyclo olefin copolymer (COC)," Polymer, 2000, vol. 41, No. 1, pp. 401-404.

Konishi, "High Performance Cyclo Olefin Polymer ZEONEX," Proceedings of SPIE, 2005, vol. 5872, pp. 587203-1-587203-8.

Mathwig, "Bias-Assisted KOH Etching of Macroporous Silicon Membranes," Journal of Micromechanics and Microengineering, 2011, vol. 21, No. 3, pp. 1-4.

Ni, "A Robust Two-Step Etching Process for Large-Scale Microfabricated $SiO_2$ and $Si_3N_4$ Mems Membranes," Sensors and Actuators A, 2005, vol. 119, No. 2, pp. 553-558.

Obuchi, "High Performance Optical Materials Cyclo Olefin Polymer ZEONEX", Proceedings of SPIE, 2007, vol. 6671, 9 pages.

Stoev, "Determination of Defects in $SiO_2$ Grown on Si (100)," Thin Solid Films, 1983, vol. 105; No. 1, pp. 61-69.

Yamazaki, "Industrialization and Application Development of Cyclo-Olefin Polymer," Journal of Molecular Catalysis A: Chemical, 2004, vol. 213, No. 1, pp. 81-87.

Zhou, "Birefringent properties of cyclic block copolymers and low-retardation-film development," Journal of the Society for Informational Display, Jan. 2010, vol. 18, No. 1, pp. 66-75.

International Search Report for PCT International Patent Application No. PCT/US2015/011560, dated Mar. 23, 2015, 4 pages.

* cited by examiner

METHOD FOR PATTERNING A MICROSTRUCTURE

TECHNICAL FIELD

The invention relates to a method for patterning a microstructure, and in particular, to a method for patterning one or more portions of a microstructure comprised of a flexible substrate, a conductor disposed on the substrate, and a metal layer disposed on the conductor, wherein the conductor is comprised of a stack of a first and a second transparent conductive oxide (TCO) layer, and a metal doped silicon oxide layer sandwiched between the two TCO layers.

BACKGROUND

Touch screen panels are now ubiquitous and commonly used as the input and display interface, for example, in automatic teller machines, gambling machines in casinos, mobile communication devices, and navigation units. Touch screen panels generally comprise a transparent base substrate (for example, glass or polyethylene terephthalate (PET)) and a transparent conductive pattern (for example, indium tin oxide (ITO)) disposed on the base substrate. A conductive metal pattern (for example, copper or silver) is then formed on the edges of the transparent conductive pattern to provide a bus bar and to reduce the resistivity of the device.

A conductive metal pattern is typically adhered to a transparent conductive pattern by a conductive adhesive. In such a case, resistivity increases over a period of time as the conductive adhesive fails at high temperature and humidity. Other existing methods, such as silver frit, are costly and require special expensive indium solder to be used to attach wires thereto. Electro deposition of conductive metals is not feasible because of the poor current carrying capacity of the transparent conductive pattern material such as ITO. Similarly, electroless deposition of metals is challenging as the chemicals needed in the plating bath undergo undesirable side reactions with the transparent conductive pattern material such as ITO, which frequently lead to etching of the transparent conductive pattern material such as ITO during plating. Silver ink printing on the transparent conductive pattern material such as ITO is widely used to provide the bus bar. This method is very expensive and not suitable for fine pitch patterning.

Therefore, there remains a need to provide a patterning method that overcomes, or at least alleviates, the above problems.

SUMMARY

According to a first aspect of the invention, there is provided a method for patterning one or more portions of a microstructure comprised of a flexible substrate, a conductor disposed on the substrate, and a metal layer disposed on the conductor, wherein the conductor is comprised of a stack of a first and a second transparent conductive oxide (TCO) layer, and a metal doped silicon oxide layer sandwiched between the two TCO layers. The method includes:
  patterning the metal layer to define one or more portions of the metal layer to be removed;
  contacting the microstructure with a metal chloride etchant to remove the defined one or more portions of the metal layer, thereby exposing one or more portions of the underlying first TCO layer, wherein the exposed one or more portions of the first TCO layer are sequentially removed by the metal chloride etchant, thereby exposing one or more portions of the underlying doped silicon oxide layer;
  contacting the microstructure with an alkali metal based etchant to remove the exposed one or more portions of the doped silicon oxide layer, thereby exposing one or more portions of the underlying second TCO layer, wherein the exposed one or more portions of the second TCO layer are sequentially removed by the alkali metal base, thereby exposing one or more portions of the underlying substrate,
  wherein the substrate is comprised of a polymer or copolymer that is resistant or substantially resistant to hydrolysis by the alkali metal based etchant.

In various embodiments, the polymer or copolymer that is resistant to hydrolysis by the alkali metal based etchant may include a polymer or copolymer having olefin in the main chain, preferably a cyclo olefin polymer (COP), a cyclo olefin copolymer (COC), or a biaxially-oriented polypropylene (BOPP), or a cyclic block copolymer (CBC).

In various embodiments, the alkali metal based etchant may be an aqueous solution of an alkali metal hydroxide, preferably sodium hydroxide (NaOH) or potassium hydroxide (KOH).

Another aspect of the invention provides a patterned microstructure including:
  a flexible substrate;
  a conductor disposed on the substrate, wherein the conductor is comprised of a stack of a first and a second transparent conductive oxide (TCO) layer, and a metal doped silicon oxide layer sandwiched between the two TCO layers; and
  a metal layer disposed on the conductor,
  wherein the substrate is comprised of a polymer or copolymer having olefin in the main chain, preferably a cyclo olefin polymer (COP), a cyclo olefin copolymer (COC), or a biaxially-oriented polypropylene (BOPP), or a cyclic block copolymer (CBC).

In certain embodiments, the patterned microstructure includes:
  a flexible substrate, wherein the substrate is comprised of a cyclo olefin polymer (COP);
  a conductor disposed on the substrate, wherein the conductor is comprised of a stack of a first and a second transparent indium tin oxide (ITO) layer, and a aluminium doped silicon oxide ($SiAlO_x$) layer sandwiched between the two ITO layers; and
  a copper (Cu) metal layer disposed on the conductor.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

The following detailed description refers to the accompanying drawings that show, by way of illustration, specific details and embodiments in which the invention may be practised. These embodiments are described in sufficient detail to enable those skilled in the art to practise the invention. Other embodiments may be utilized and changes may be made without departing from the scope of the invention. The various embodiments are not necessarily mutually exclusive, as some embodiments can be combined with one or more other embodiments to form new embodiments.

Figure 1A:
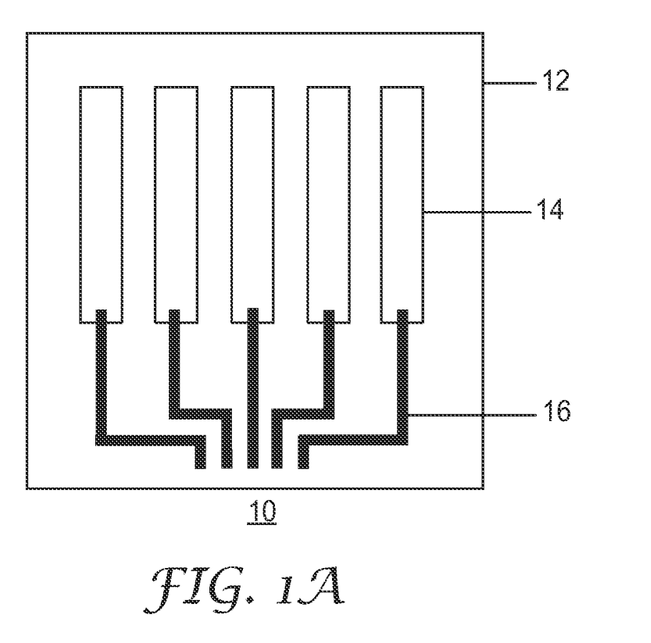
FIG. 1A shows a plan view of a patterned microstructure.

FIG. 1A shows the plan view of a patterned microstructure 10 in accordance with various embodiments. The microstructure 10 may be comprised of a flexible substrate 12, a conductor 14 and a metal layer 16. The substrate 12, the conductor 14 and the metal layer 16 may be arranged such that the conductor 14 is disposed on the substrate 12 and the metal layer 16 may be disposed on the conductor 14. The microstructure 10 may form part of a touch screen panel, for example.

For the sake of the present discussion and for brevity, while the microstructure 10 may be referred to as comprising a substrate 12, a conductor 14 and a metal layer 16, it is to be understood and appreciated by a skilled person in the art that one or more of the respective components may be included as well. For example, in the illustration shown in FIG. 1A, a plurality of conductors 14 are disposed on the substrate 12 and a plurality of metal layers 16 are disposed on the conductors 14. As shown, the plurality of conductors 14 are disposed apart from one another and the plurality of metal layers 16 are disposed apart from one another. In preferred embodiments, the number of conductors 14 corresponds to the number of metal layers 16. In other embodiments, the number of conductors 14 does not correspond to the number of metal layers 16.

Figure 1B:
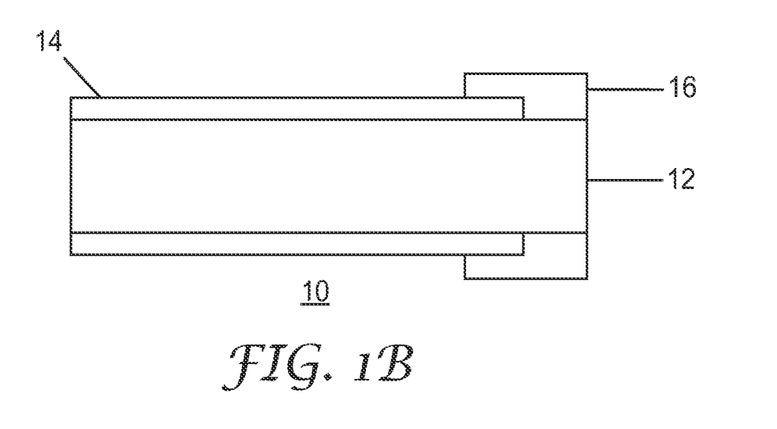
FIG. 1B shows a cross-sectional view of the microstructure of FIG. 1A.

FIG. 1B shows a cross-sectional view of the microstructure 10 of FIG. 1A. In various embodiments, the conductor 14 may be disposed on two opposing major surfaces of the substrate 12 of the microstructure 10. Likewise, the metal layer 16 may be disposed on the conductor 14 disposed on two opposing major surfaces of the substrate 12 of the microstructure 10. A portion of the metal layer 16 may be disposed on the conductor 14 while another portion of the metal layer 16 may be disposed on the substrate 12 (i.e. another portion of the metal layer 16 is touching the substrate 12) as illustrated in FIG. 1B. The arrangement of the conductor 14 and the metal layer 16 on the two opposing major surfaces of the substrate 12 may be suitable for applications where dual-side touch screen panels are desired, for example. In other embodiments, the conductor 14 and the metal layer 16 may be disposed only on one surface of the substrate 12 of the microstructure 10.

Figure 2A:
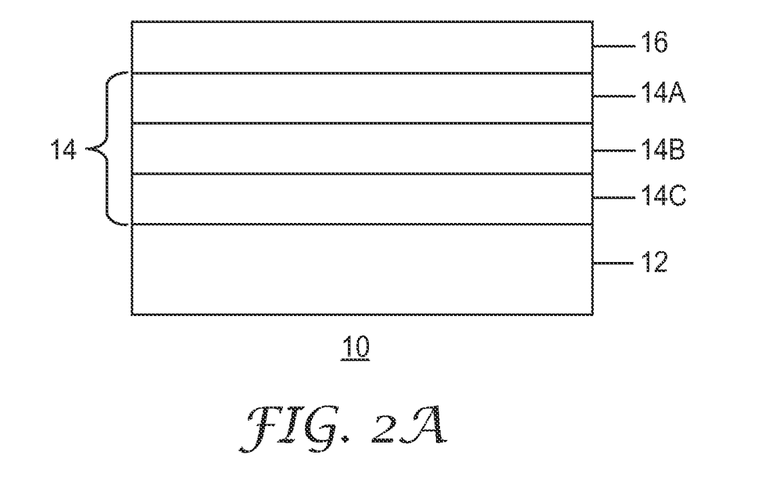
FIG. 2A shows a microstructure before being patterned by the present method.
Figure 2B:
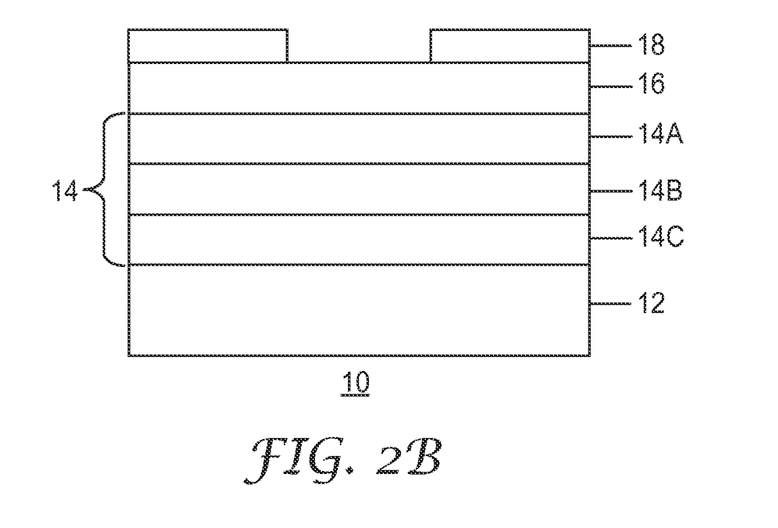
FIG. 2B shows a microstructure having an etch stopper disposed on the metal layer before being patterned by the present method.
Figure 2C:
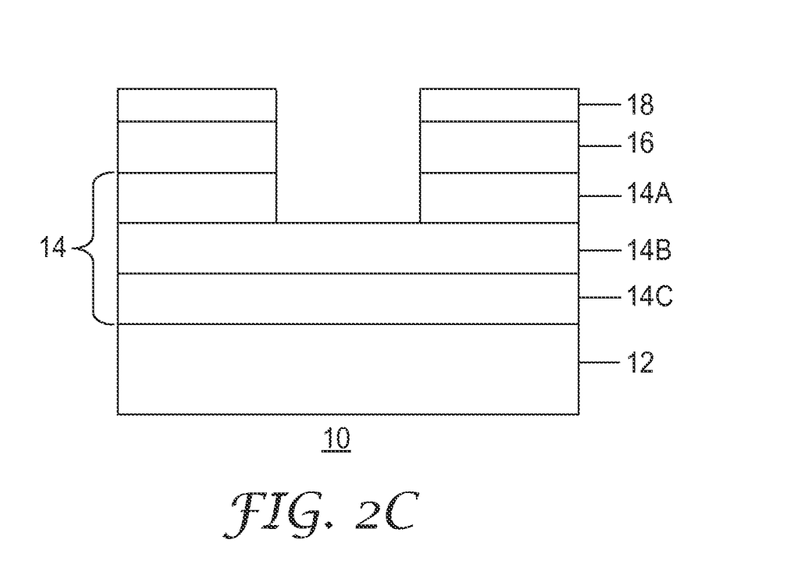
FIG. 2C shows a microstructure being patterned by the present method until the metal doped silicon oxide layer is exposed.
Figure 2D:
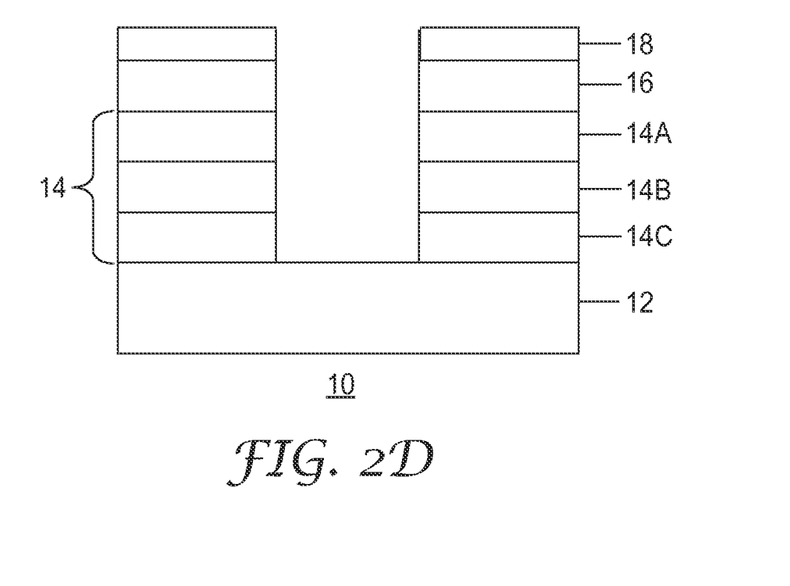
FIG. 2D shows a microstructure being patterned by the present method until the substrate is exposed, i.e. the final microstructure obtained by the present method.

In various embodiments illustrated in FIG. 2D, the conductor 14 may be comprised of a stack of a first and a second transparent conductive oxide (TCO) layer 14A, 14C, and a metal doped silicon oxide layer 14B sandwiched between the two TCO layers 14A, 14C. Details of the conductor 14 and its manufacturing method may be found in PCT Publication No. WO 2013/010067, the contents of which being hereby incorporated by reference in its entirety for all purposes.

The substrate 12 may be comprised of a polymer or copolymer that is resistant or substantially resistant to hydrolysis by an alkali metal base solution. In other words, when contacted with the alkali metal base solution, the polymer or copolymer of the substrate 12 does not hydrolyze at all, or if it does, it hydrolyzes minimally, such that 10%, or 9%, or 8%, or 7%, or 6%, or 5%, or 4%, or 3%, or 2%, or 1%, or less of the substrate is hydrolyzed. The extent of the hydrolysis of the substrate 12 may be examined physically. For example, the substrate 12 may be considered to have hydrolyzed minimally if there are no changes in the colour or a thickness reduction of not more than 1 μm has occurred.

In various embodiments, the substrate 12 may be comprised of a polymer or copolymer having olefin in the main chain.

The term "olefin" refers to compounds having a C=C bond.

In various embodiments, the substrate 12 may comprise a cyclo olefin polymer (COP), a cyclo olefin copolymer (COC), or a biaxially-oriented polypropylene (BOPP).

The cyclo olefin polymer may, for example, be synthesized by norbornene ring-opening metathesis polymerization and an additional polymerization process as described in Yamazaki, *Journal of Molecular Catalysis A: Chemical* 213 (2004) 81-87, the content of which is hereby incorporated by reference in its entirety for all purposes.

The cyclo olefin copolymer may, for example, be synthesized by the copolymerization of norbornene (NB) with ethylene as described in Chu et al., *Polymer* 41 (2000) 401-404, the contents of which being hereby incorporated by reference in its entirety for all purposes.

Alternatively, the substrate 12 may comprise a cyclic block copolymer (CBC). The cyclic block copolymer may, for example, be synthesized by fully hydrogenating block copolymers of styrene and conjugated diene as described in Zhou et al., *Journal of the SID* 18/1 (2010) 66-75, the contents of which being hereby incorporated by reference in its entirety for all purposes.

In yet further alternative embodiments, the substrate 12 may be comprised of polyethylene naphthalate (PEN) or a polyimide.

In one embodiment, the substrate 12 may be comprised of a COP.

In various embodiments, the first and second TCO layers 14A, 14C may be comprised of indium tin oxide (ITO), fluorine doped tin oxide (FTO), or indium doped zinc oxide (IZO). The first and second TCO layers 14A, 14C may be the same material or different materials from each other. For example, in one embodiment the first and second TCO layers 14A, 14C are each ITO.

The first and second TCO layers 14A, 14C can have the same or different thicknesses. For example, suitable thickness for the first and second TCO layers 14A, 14C may include 50 nm or less, such as 45 nm, 40 nm, 35 nm, 30 nm, 25 nm, 20 nm, or less. In illustrative embodiments, the first and the second TCO layers 14A, 14C thicknesses are the same, for example about 20-25 nm.

According to various embodiments, the metal doped silicon oxide 14B sandwiched between the first and the second TCO layers 14A, 14C may be aluminum doped silicon oxide ($SiAlO_x$). In alternative embodiments, the metal doped silicon oxide 14B sandwiched between the first and the second TCO layers 14A, 14C may be silver or zinc doped silicon oxide. The metal doped silicon oxide 14B can have a thickness of about 50 nm or less, such as 45 nm, 40 nm, 35 nm, 30 nm, or less.

In certain embodiments, the conductor 14 may be comprised of a stack of a first ITO layer 14A of about 20-25 nm thickness, a second ITO layer 14C of about 20-25 nm thickness, and a $SiAlO_x$ layer 14B sandwiched between the two ITO layers 14A, 14C, the $SiAlO_x$ layer 14B having a thickness of about 40-45 nm.

In various embodiments, the metal layer 16 may be comprised of copper (Cu), nickel (Ni), silver (Ag), palladium (Pd), gold (Au), molybdenum (Mo), titanium (Ti), or an alloy thereof.

In one embodiment, the metal layer 16 may be comprised of Cu.

Next, a method for patterning one or more portions of the microstructure 10 as described above will be described. The formation of the patterned microstructure by the present method is illustrated in FIGS. 2A-2D.

FIG. 2A shows a microstructure 10 before being patterned by the present method. The microstructure 10 comprises a flexible substrate 12, a conductor 14 and a metal layer 16. The substrate 12, the conductor 14 and the metal layer 16 are arranged such that the conductor 14 is disposed on the substrate 12 and the metal layer 16 is disposed on the conductor 14. The conductor 14 comprises of a stack of a first and a second transparent conductive oxide (TCO) layer 14A, 14C, and a metal doped silicon oxide layer 14B sandwiched between the two TCO layers 14A, 14C.

The method may include patterning the metal layer 16 to define one or more portions of the metal layer 16 to be removed. The metal layer 16 may be patterned, for example, by photolithographic techniques commonly used in the art. In one illustration, a pre-patterned etch stopper or resist 18 may first be disposed on the metal layer 16 (FIG. 2B). In other words, the patterns pre-formed on the etch stopper or resist 18 correspond to the patterns to be transferred to the underlying metal layer 16 and subsequent layers underneath, thereby defining one or more portions of the metal layer 16 to be removed.

After disposing the etch stopper or resist 18 on the metal layer 16, the microstructure 10 is contacted with a metal chloride etchant. The metal chloride etchant removes the defined one or more portions of the metal layer 16, thereby exposing one or more portions of the underlying first TCO layer 14A. Upon further contact of the metal chloride etchant with the exposed one or more portions of the underlying first TCO layer 14A, the one or more portions of the underlying first TCO layer 14A are subsequently removed by the metal chloride etchant, thereby exposing one or more portions of the underlying doped silicon oxide layer 14B (FIG. 2C).

The metal chloride etchant used in the above etching step advantageously first removes the one or more portions of the metal layer 16, followed by the sequential removal of the one or more portions of the first TCO layer 14A.

In various embodiments, the metal chloride etchant is a mixture of hydrochloric acid and cupric chloride ($CuCl_2$) or a mixture of hydrochloric acid and ferric chloride ($FeCl_3$).

Following the removal of one or more portions of the first TCO layer 14A, the microstructure 10 is contacted with an alkali metal based etchant. In this etching step, the alkali metal based etchant selectively removes the exposed one or more portions of the doped silicon oxide layer 14B, thereby exposing one or more portions of the underlying second TCO layer 14C. Upon further contact of the alkali metal based etchant with the exposed one or more portions of the underlying second TCO layer 14C, the one or more portions of the underlying second TCO layer 14C are removed by the alkali metal based etchant, thereby exposing one or more portions of the underlying substrate 12 (FIG. 2D).

At this time, further contact of the alkali metal based etchant with the exposed one or more portions of the substrate 12 does not lead to removal of the exposed one or more portions of the substrate 12 since the substrate 12 is chosen to comprise a polymer or a copolymer that is resistant or substantially resistant to hydrolysis by the alkali metal based etchant.

In various embodiments, the alkali metal based etchant may be an aqueous solution of an alkali metal hydroxide, such as sodium hydroxide (NaOH) or potassium hydroxide (KOH). The concentration of KOH or NaOH may be between 4 wt % and 43 wt % based on the total weight of the alkali metal based etchant. In the case of a 4 wt % alkali metal based etchant, the alkali metal based etchant etches the metal doped silicon oxide layer 14B and the second TCO layer 14C, and strips the etch stopper/photoresist 18 simultaneously. In the case of a 43 wt % alkali metal based etchant, the alkali metal based etchant etches the metal doped silicon oxide layer 14B and the second TCO layer 14C but does not strip the etch stopper/photoresist 18.

In one embodiment, the alkali metal based etchant may be 4 wt % KOH.

Advantageously, in the second contacting step the alkali metal based etchant may be contacted with the microstructure 10 for a short period of time and at a low temperature. In various embodiments, a contact period of about 30 seconds to about 4 minutes at a temperature of about 50° C. to about 90° C. is sufficient to remove the one or more portions of the metal doped silicon oxide layer 14B and the second TCO layer 14C.

In various embodiments such as in touch screen panel applications, the substrate 12 and the conductor 14 are transparent with transparency of not less than 88% in the visible light region.

In order that the invention may be readily understood and put into practical effect, particular embodiments will now be described by way of the following non-limiting examples.

EXAMPLES

In this example, a method of patterning a transparent conductor consisting of layers of ITO and $SiAlO_x$ and a conductive metal bus bar is illustrated. In this method, the transparent conductor is sputtered on opposing sides of a flexible transparent substrate. The transparent conductor consists of three layers, namely, ITO (20-25 nm)/$SiAlO_x$ (40-45 nm)/ITO (20-25 nm).

Next, a copper layer is sputtered on the transparent conductor. Electroplating may be used to electroplate the copper to make a thicker copper layer of about 3-12 µm.

The copper layer and the transparent conductor are then patterned using a photolithographic method whereby commercially available cupric chloride etchant or ferric chloride etchant are used to etch the copper and ITO of the transparent conductor simultaneously.

Etching of $SiAlO_x$ by cupric chloride etchant or ferric chloride etchant is very difficult. Hence, to increase the transparent conductor etching rate and to facilitate clean etching, an alkali metal based etching solution is used to etch the $SiAlO_x$ layer. In this case, alkali metal hydroxides such as NaOH or KOH are used. The alkali metal hydroxide can be dissolved in water to get the desired concentration (e.g. 4-43 wt %).

Photoresist can be stripped in KOH solution upon longer exposure time, but copper acts as mask and protects the underlying transparent conductor pattern. Since alkali metal hydroxide selectively etches ITO and SiAlO$_x$ layers, the copper layer is protected from being over-etched as in the case of acidic etchants. In the case of an acidic etchant, a longer etching time is required to etch the SiAlO$_x$ layer. As a result, the copper layer is over-etched. Due to over-etching of copper, getting fine pitch below 100 μm of copper bezel is a challenge and a thicker copper layer is required in order to compensate the side-wall etching. Present method employing alkali metal based etchants therefore avoids issues related to acidic etchants.

However, the use of alkali metal based etchants is not favorable in the case of substrates such as glass which are hydrolyzed by the alkali metal based etchants. To avoid this problem, transparent flexible substrates are selected from non-hydrolizable (or substantially less hydrolizable) polymers such as cyclo olefin polymers, cyclo olefin copolymers, biaxially-oriented polypropylene or cyclic block copolymers. Such polymer systems do not have amide, acid and ester functionality for the hydrolysis. In a specific example, a 100 μm thick cyclo olefin polymer (ZF-16) from Zeon industries is used. Optical properties of the substrate was tested before and after etching process. As shown in the data below, optical properties such as transmittance, Haze, clarity and b* values are not affected during etching process.

Figure 3:
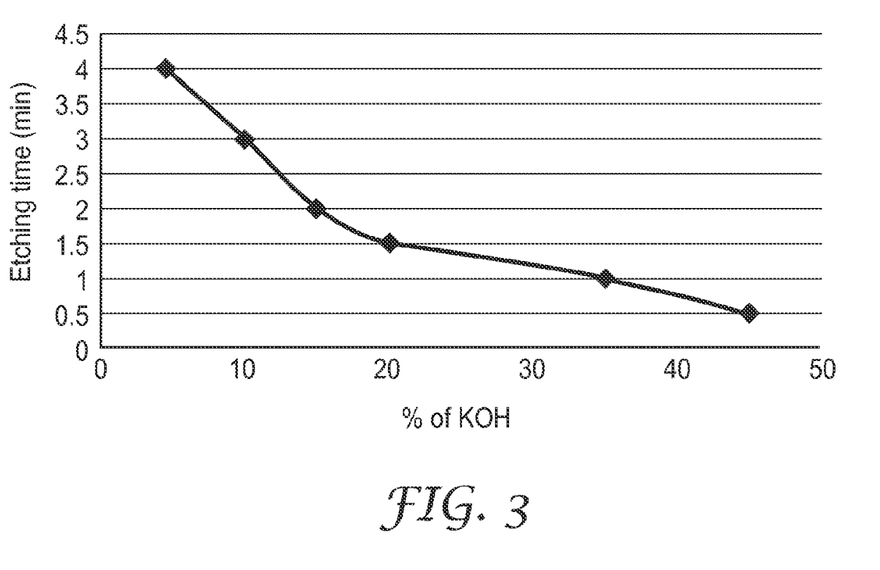
FIG. 3 shows the etching time versus the concentration of the KOH solution in one example.

Table 1 shows examples of etching parameters using KOH as the alkali metal based etchant for a cyclo olefin polymer based substrate. The etching time versus the concentration of the KOH solution is illustrated in FIG. 3. Table 2 compares the optical properties of the substrate before and after etching.

TABLE 1

Examples of Etching Parameters used in Present Method

|  | Example 1 | Example 2 |
| --- | --- | --- |
| KOH | 4 g | 43 g |
| Water | 96 g | 57 g |
| Temperature | 80 C. | 80 C. |
| Etch time | 4 min | 0.5 min |
| Substrate | Cyclo olefin polymer | Cyclo olefin polymer |

TABLE 2

Optical Properties of COP Film Before and After Treating with Alkali Etchants

|  | COP film | COP after treating with 4.5% KOH at 90° C. for 10 minutes | COP after treating with 45% KOH at 90° C. for 10 minutes |
| --- | --- | --- | --- |
| Transmittance % | 93.3 | 93.5 | 93.5 |
| Haze % | 0.11 | 0.23 | 0.2 |
| Clarity % | 100 | 100 | 100 |
| b* | 0.13 | 0.13 | 0.13 |

Based on the present method, optical properties of the substrate including a transmittance of not less than 89%, haze of not more than 2% and a clarity of not less than 98% have been achieved. The present method makes use of COP, COC, BOPP materials having special low retardation property which leads to excellent outdoor readable properties.

In summary, conventional etching methods using alkali based etchants such as ammonia and oxidants are not suitable since these etchants cannot etch silicon oxide or metal doped silicon oxide sandwiched between two transparent conductive oxide layers. The present disclosure describes a method of making transparent conductor and conductive metal pattern for touch screen sensor, for example, using alkali metal based etchants by selecting a substrate that is resistant or substantially resistant to hydrolysis by the alkali metal based etchants.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. A method for patterning one or more portions of a microstructure comprised of a flexible substrate, a conductor disposed on the substrate, and a metal layer disposed on the conductor, wherein the conductor is comprised of a stack of a first and a second transparent conductive oxide (TCO) layer, and a metal doped silicon oxide layer sandwiched between the two TCO layers, the method comprising:

patterning the metal layer to define one or more portions of the metal layer to be removed;

contacting the microstructure with a metal chloride etchant to remove the defined one or more portions of the metal layer, thereby exposing one or more portions of the underlying first TCO layer, wherein the exposed one or more portions of the first TCO layer are sequentially removed by the metal chloride etchant, thereby exposing one or more portions of the underlying doped silicon oxide layer;

contacting the microstructure with an alkali metal based etchant to remove the exposed one or more portions of the doped silicon oxide layer, thereby exposing one or more portions of the underlying second TCO layer, wherein the exposed one or more portions of the second TCO layer are sequentially removed by the alkali metal base, thereby exposing one or more portions of the underlying substrate, wherein the substrate is comprised of a polymer or copolymer that is resistant or substantially resistant to hydrolysis by the alkali metal based etchant.

2. The method of claim 1, wherein the polymer or copolymer that is resistant to hydrolysis by the alkali metal based etchant comprises a polymer or copolymer having olefin in the main chain, preferably a cyclo olefin polymer (COP), a cyclo olefin copolymer (COC), or a biaxially-oriented polypropylene (BOPP), or a cyclic block copolymer (CBC).

3. The method of claim 2, wherein the polymer or copolymer that is resistant to hydrolysis by the alkali metal base is a COP.

4. The method of claim 1, wherein the polymer or copolymer that is substantially resistant to hydrolysis by the alkali metal base is polyethylene naphthalate (PEN) or a polyimide.

5. The method of claim 1, wherein the alkali metal based etchant is an aqueous solution of an alkali metal hydroxide, preferably sodium hydroxide (NaOH) or potassium hydroxide (KOH).

6. The method of claim 5, wherein the alkali metal based etchant is an aqueous solution of KOH or NaOH, preferably KOH, wherein the concentration of KOH or NaOH is between 4 wt % and 43 wt % (based on total weight of the alkali metal based etchant).

7. The method of claim 1, wherein the first and the second TCO layer are the same material.

8. The method of claim 7, wherein the first and the second TCO layer are comprised of indium tin oxide (ITO).

9. The method of claim 1, wherein the metal doped silicon oxide is aluminium doped silicon oxide ($SiAlO_x$).

10. The method of claim 1, wherein the metal chloride etchant is a mixture of hydrochloric acid and cupric chloride ($CuCl_2$) or hydrochloric acid and ferric chloride ($FeCl_3$).

11. The method of claim 1, wherein the microstructure is contacted with the alkali metal based etchant over a period of between 30 s and 4 min at a temperature of about 50° C. to 93° C.

12. The method of claim 1, wherein the metal layer is comprised of copper (Cu), nickel (Ni), silver (Ag), palladium (Pd), gold (Au), molybdenum (Mo), titanium (Ti), or an alloy thereof.

13. The method of claim 1, wherein the substrate and the conductor have a transparency not less than 88% in the visible light region.

14. The method of claim 1, wherein the metal layer is patterned with a resist.

15. A patterned microstructure comprising:
a flexible substrate;
a conductor disposed on the substrate, wherein the conductor is comprised of a stack of a first and a second transparent conductive oxide (TCO) layer, and a metal doped silicon oxide layer sandwiched between the two TCO layers; and
a metal layer disposed on the conductor,
wherein the substrate is comprised of a polymer or copolymer having olefin in the main chain, preferably a cyclo olefin polymer (COP), a cyclo olefin copolymer (COC), or a biaxially-oriented polypropylene (BOPP), or a cyclic block copolymer (CBC).

16. The patterned microstructure of claim 15, wherein the substrate is comprised of COP.

17. The patterned microstructure of claim 15, wherein the first and the second TCO layer are comprised of indium tin oxide (ITO).

18. The patterned microstructure of claim 15, wherein the metal doped silicon oxide is aluminium doped silicon oxide ($SiAlO_x$).

19. The patterned microstructure of claim 15, wherein the metal layer is comprised of copper (Cu), nickel (Ni), silver (Ag), palladium (Pd), gold (Au), molybdenum (Mo), titanium (Ti), or an alloy thereof.

20. A patterned microstructure comprising:
a flexible substrate, wherein the substrate is comprised of a cyclo olefin polymer (COP);
a conductor disposed on the substrate, wherein the conductor is comprised of a stack of a first and a second transparent indium tin oxide (ITO) layer, and a aluminium doped silicon oxide ($SiAlO_x$) layer sandwiched between the two ITO layers; and
a copper (Cu) metal layer disposed on the conductor.

* * * * *